O. G. VOLD.
SEED CORN CRATE AND DRIER.
APPLICATION FILED MAR. 17, 1914.

1,108,412.

Patented Aug. 25, 1914.

Witnesses

O. G. Vold,
Inventor by C. A. Snow & Co.
Attorneys

THE NORRIS PETERS CO., PHOTO-LITHO., WASHINGTON, D. C.

UNITED STATES PATENT OFFICE.

OLE G. VOLD, OF DAWSON, MINNESOTA.

SEED-CORN CRATE AND DRIER.

1,108,412.  Specification of Letters Patent.  Patented Aug. 25, 1914.

Application filed March 17, 1914. Serial No. 825,395.

*To all whom it may concern:*

Be it known that I, OLE G. VOLD, a citizen of the United States, residing at Dawson, in the county of Lac qui Parle and State of Minnesota, have invented a new and useful Seed-Corn Crate and Drier, of which the following is a specification.

The present invention appertains to a seed corn crate and drier, and aims to provide a novel holder and carrier for ears of seed corn, whereby the same may be properly stored or transported, and ventilated for purpose of curing and preserving the seed corn.

As a more specific object, the present invention comprehends the provision of a crate or container having slidably and removably mounted therein, a plurality of racks, each adapted to hold a series of ears of seed corn, whereby when the racks are removed, the seed corn may be readily applied to and removed from the racks, or the seed corn may be examined and kernels thereof removed when desired.

It is also within the scope of the present invention, to provide a contrivance of the nature indicated, which will be comparatively simple, light, unencumbered and inexpensive in construction, as well as being simple, convenient, serviceable and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein—

Figure 1:
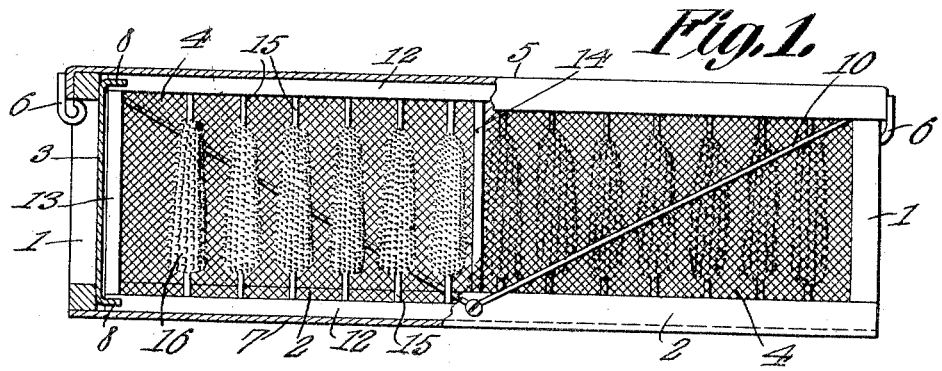
Figure 2:
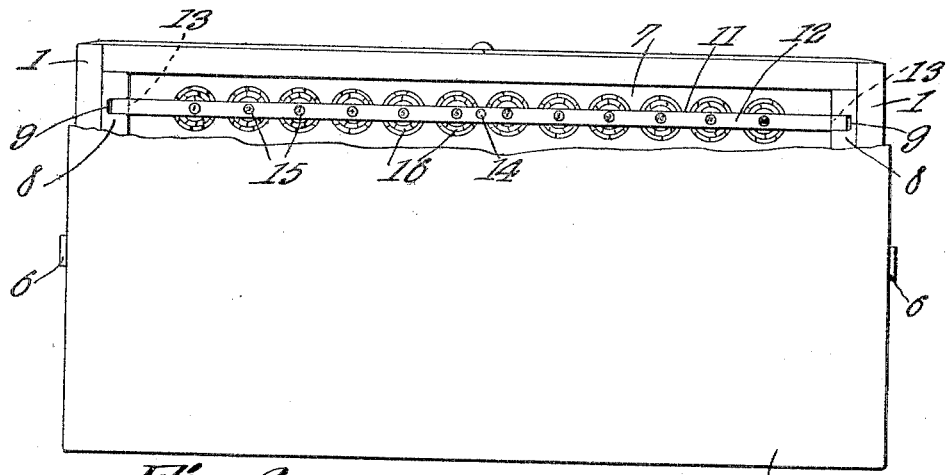
Figure 3:
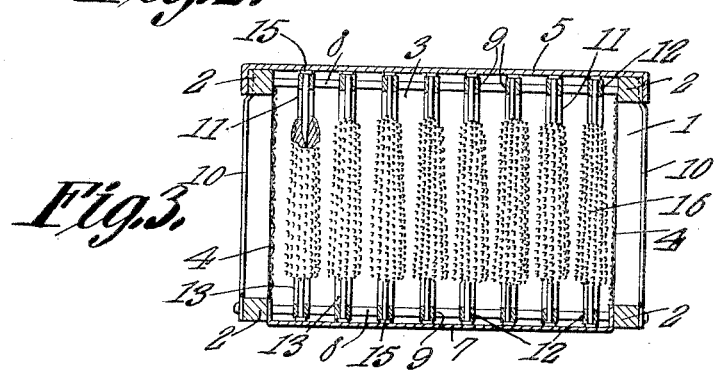

Figure 1 is a side elevation of the improved crate and drier, portions being broken away. Fig. 2 is a plan view of the device, a portion of the cover or top being broken away. Fig. 3 is a cross section of the device.

In carrying out the present invention, there is provided a receptacle or container comprising rectangular end frames 1, and upper and lower longitudinal beams or sills 2 connecting the frames 1, the said parts being preferably, although not necessarily, constructed of wood. Sheet metal end plates 3 are secured to the inner faces of the end frames 1, and meshed wire or reticulated side panels 4 are secured to the inner faces of the sills or bars 2 and the uprights or stiles of the end frames 1.

A sheet metal cover or top 5 having a downturned rim or marginal apron, is adapted to seat upon the upper side rails 2 and the upper rails of the end frames 1 with the rim or flange of the cover overlapping the sides and ends of the container or receptacle. The ends of the cover 5 are preferably provided with clasp elements or latches 6 engageable with or under the upper rails or cross pieces of the end frames 1, to retain the cover in place, although readily permitting the cover to be removed.

The bottom 7 of the container is preferably of sheet metal, and has its sides and ends overlapping the lower side rails 2 and the lower rails or cross bars of the end frames 1.

The upper and lower ends of the ends plates 3 are inturned or bent angularly to provide inwardly projecting flanges or lips 8 adjacent, and preferably spaced slightly from, the cover or top 5 and the bottom 7, respectively. The flanges or lips 8 are each provided with a series of notches 9 forming vertical guide-ways or slide-ways, inasmuch as the notches of the superposed flanges 8 are in vertical alinement.

The container or frame thereof, is rendered substantial by wire braces 10, the terminals of which are preferably secured to the end portions of the upper side rails 2, and the upper ends of the end frames 1, and the intermediate portions of which are preferably secured to the intermediate portions of the lower side rails 2.

Normally disposed within the container is a series of racks or individual carriers 11, each of which embodies upper and lower rails or slats 12, and upright stiles or end pieces 13 connecting the terminals of the rails or slats 12. The intermediate or central portions of the rails 12 are preferably connected by upright rods or stiles 14 to stiffen the racks. Each of the rails or slats 12 is provided with a longitudinal series of vertical apertures, through which are insertible nails or pins 15, which are engageable into the ends of the ears of the seed corn 16.

In use, when the cover 5 is removed, the racks or individual carriers 11 may be readily slid or drawn upwardly out of the container or box, in order that the seed corn may be applied to the racks. In filling each rack with seed corn, the ears are placed between the rails or bars 12 of the rack, and the nails or pins 15 are passed through the rails 12 and driven or forced into the ends of the ears of corn, whereby the corn will be supported in an upright position between the upper and lower rails of the rack. Then, as the racks are filled, the racks are placed back into the container, the end pieces 13 of the racks being inserted downwardly through the proper notches 9 of the flanges 8, in order that the racks may be slid downwardly properly into the container. When the filled racks have been placed in the container or receptacle, the ears of the seed corn will all be supported in an upright or vertical position, and will be spaced apart, to permit of the circulation of air therebetween. It is to be observed that the racks are parallel with each other, and with the sides of the container, the sides being reticulated or foraminous to permit of the passage of the air therethrough, to ventilate the seed corn, so as to facilitate the drying and curing thereof, for the proper preservation of the kernels. After the cover 5 is applied, the seed corn will be completely protected from the attack of rats, or other rodents or vermin, although the air may circulate freely through the sides of the crate and between the ears of corn.

It is to be observed that each ear of corn is supported individually, the ears all being spaced apart, and the kernels being out of engagement with the several parts of the crate or holding means, in order that when the crate is handled or transported, there will be no tendency for the corn to become shelled. The nails or pins 15 being passed through the rails 12 of the racks and entering the ends of the ears of corn, will support the individual ears in an effective manner, notwithstanding the fact that the crate may be handled or transported, or may be set on one end or side or even inverted. A number of the crates may be piled up or stacked without interfering with the ventilation of the corn.

When it is desired to remove the seed corn, either for inspection, or for the removal of the corn, the racks may be withdrawn after the cover 5 has been removed, in order that the kernels of the several ears, may be inspected, or if desired, a few kernels may be removed from each ear, for planting, in order to test the quality of the kernels of the various ears. The heads of the nails or retaining elements 15 may be numbered or otherwise designated, if desired, in order that a record may be kept, of the several ears, and with a minimum amount of labor. To remove the ears from the racks, it is only necessary to withdraw the nails or pins 15 from the ends of the ears of corn.

From the foregoing, taken in connection with the drawings, the several advantages of the present crate and drier will be obvious without further comment, it being observed that the objects aimed at have been carried out satisfactorily by the provision of the unique structure herein disclosed.

Having thus described the invention, what is claimed as new is:

1. In a device of the character described, a container, racks removably disposed therein and each embodying upper and lower apertured rails, and pins insertible through the apertures of the rails of each rack to engage the ends of ears of corn.

2. In a device of the character described, a container including end plates having upper and lower inturned notched flanges, racks each comprising upper and lower apertured rails and end pieces connecting the rails, the end pieces of the racks engaging the notches of the said flanges, and pins insertible through the apertures of the racks and engageable with the ends of the ears of corn.

In testimony that I claim the foregoing as my own, I have hereto affixed my signature in the presence of two witnesses.

OLE G. VOLD.

Witnesses:
J. H. ENGELSTAD,
THEODORE CHRISTIANSON.

---

Copies of this patent may be obtained for five cents each, by addressing the "Commissioner of Patents, Washington, D. C."